US005635088A

United States Patent [19]

Brewer et al.

[11] Patent Number: 5,635,088

[45] Date of Patent: Jun. 3, 1997

[54] LIQUID COOLED PLASMA ARC TORCH SYSTEM AND METHOD FOR REPLACING A TORCH IN SUCH SYSTEM

[75] Inventors: Timothy M. Brewer; Jeffrey L. Peterson; John Sobr, all of Lebanon, N.H.

[73] Assignee: Hypertherm, Inc., Hanover, N.H.

[21] Appl. No.: 368,626

[22] Filed: Jan. 4, 1995

[51] Int. Cl.[6] .................................................... B23K 10/00

[52] U.S. Cl. ................................ 219/121.49; 219/121.48; 219/121.39

[58] Field of Search ........................ 219/121.39, 121.44, 219/121.59, 121.49, 121.58, 121.48, 121.36, 121.67

[56] References Cited

U.S. PATENT DOCUMENTS

| | | | |
|---|---|---|---|
| 3,567,898 | 3/1971 | Fein | 219/121 |
| 3,575,568 | 4/1971 | Tateno | 219/75 |
| 3,725,635 | 4/1973 | Fink et al. | 219/121 |
| 3,767,218 | 10/1973 | Linthieum et al. | 279/75 |
| 3,949,188 | 4/1976 | Tateno | 219/121 |
| 4,174,477 | 11/1979 | Essers et al. | 219/121 |
| 4,195,216 | 3/1980 | Beauchamp et al. | 219/121 |
| 4,203,022 | 5/1980 | Couch, Jr. et al. | 219/121 |
| 4,291,217 | 9/1981 | Braun | 219/121 |
| 4,338,507 | 7/1982 | Scott | 219/121.49 |
| 4,410,788 | 10/1983 | Summers et al. | 219/130 |
| 4,559,439 | 12/1985 | Camacho et al. | 219/121 |
| 4,692,582 | 9/1987 | Marhic | 219/121 |
| 4,743,076 | 5/1988 | Davis et al. . | |
| 4,864,099 | 9/1989 | Cusick, III et al. | 219/137 |
| 4,902,871 | 2/1990 | Sanders et al. | 219/121 |
| 5,266,775 | 11/1993 | Brolund et al. | 219/121.39 |
| 5,326,113 | 7/1994 | Montalvo, III | 279/209 |
| 5,328,516 | 7/1994 | Dietiker | 118/723 |
| 5,409,322 | 4/1995 | Horikawa et al. | 403/328 |

FOREIGN PATENT DOCUMENTS

| | | |
|---|---|---|
| 0339920 | 4/1989 | European Pat. Off. . |
| 2134932 | 6/1971 | Germany . |
| 80-35761C | 9/1978 | Japan . |
| 2178138 | 6/1985 | United Kingdom . |

*Primary Examiner*—Mark H. Paschall
*Attorney, Agent, or Firm*—Test, Hurwitz & Thibeault, LLP

[57] ABSTRACT

A liquid cooled plasma arc cutting torch system includes a plasma arc torch, a torch receptacle and a cooling system. The torch is removably mounted to the receptacle. The cooling system includes a liquid storage tank, supply and return lines providing fluid communication paths between the tank and the receptacle and a pump for pumping the cooling liquid from the tank through the supply line, the receptacle, the torch and the return line. A valve coupled to the return line includes a nozzle that directs liquid toward an inside top surface of the tank. A flow restriction member may be provided to equalize pressure in the supply with atmospheric pressure when the pump is not operating. A pressurized gas source may be utilized to substantially clear the receptacle, torch and return line of liquid when the pump is not operating.

25 Claims, 3 Drawing Sheets

LIQUID COOLED PLASMA ARC TORCH SYSTEM AND METHOD FOR REPLACING A TORCH IN SUCH SYSTEM

FIELD OF THE INVENTION

The invention relates generally to the field of plasma arc torches. In particular, the invention relates to various features of a liquid cooled plasma arc cutting torch system and a process for replacing a torch in such a system.

BACKGROUND OF THE INVENTION

Plasma arc torch systems are widely used in the cutting of metallic materials. Such systems include a plasma arc torch mounted to a torch receptacle, an electrode mounted within the torch, a nozzle with a central exit orifice, electrical connections, passages for cooling and arc control fluids, a swirl ring to control the fluid flow patterns, and a power supply. The torch produces a plasma arc, which is a constricted ionized jet of a plasma gas with high temperature and high momentum. Gases used in the torch may be non-reactive, e.g. nitrogen or argon, or reactive, e.g. oxygen or air.

In process of plasma arc cutting of a metallic workpiece, a pilot arc potential (voltage) is first applied between the electrode (cathode) and the nozzle (anode). A voltage generated by a high voltage generator (HFHV) is applied to breakdown the gap between the electrode and the nozzle, allowing a pilot arc to form between the electrode and the nozzle. After the pilot arc is formed, the power supply initiates the transfer of the arc to the workpiece. The torch is operated in this transferred plasma arc mode, characterized by the conductive flow of ionized gas from the electrode to the workpiece, for the cutting of the workpiece.

Plasma arc cutting torches produce a transferred plasma jet with a current density that is typically in the range of 20,000 to 40,000 amperes/in$^2$. High definition torches are characterized by narrower jets with higher current densities, typically about 60,000 amperes/in$^2$. High definition torches produce a narrow cut kerf and a square cut angle. Such torches also have a thinner heat affected zone and are more effective in producing a dross free cut and blowing away molten metal.

In operation, high definition torches generally require efficient cooling of the nozzle. Liquid cooling has proven effective in achieving the required degree of cooling. In various high definition plasma arc torch systems manufactured by Hypertherm, Inc., a cooling liquid, such as water, circulates through the torch via internal passages and chambers, eventually flowing over portions of the nozzle to cool the nozzle.

Various problems have been found to exist in connection with the operation of plasma arc cutting torch systems. For example, when various consumable parts (e.g., the nozzle and electrode) require replacement, the torch is manually dissembled in a piece by piece manner. More specifically, the torch is disassembled to remove and replace worn consumables. Such changing processes require extensive human involvement and therefore may be time consuming and expensive.

It is therefore a principal object of this invention to provide a plasma arc cutting torch system that facilitates the changing of a torch.

Another principal object of this invention to provide a plasma arc cutting torch system that minimizes the amount of liquid leakage during the process of removing a torch.

Another principal object of this invention is to provide a cooling system for a plasma arc cutting torch that provides efficient and reliable cooling when the torch is started.

SUMMARY OF THE INVENTION

The invention features a liquid cooled plasma arc cutting torch system comprising a plasma arc torch, a torch receptacle, and a cooling system. The torch is removably mounted to the receptacle and includes an electrode and a nozzle having a central orifice for a plasma arc. The cooling system includes a liquid storage tank, supply and return lines providing fluid communication paths between the tank and receptacle, and a pump for pumping the cooling liquid from the tank through the supply line, the receptacle, the torch and the return line. In one embodiment, the cooling liquid is water.

A valve may be utilized for returning the liquid to the tank. The valve includes a body coupled to the return line and a nozzle extending from the body in fluid communication with the tank. At least a portion of the nozzle is disposed at an angle of greater than zero degrees, and up to about 90 degrees, relative to a horizontal axis through the body. As such, liquid passing through the nozzle is directed toward an inside top surface of the tank. This results in only a small amount of aeration of the liquid in the tank.

A pressurized gas source may be coupled to the supply line via a gas line. The gas source provides pressurized gas, such as air, to the supply line when the pump is non-operative. The pressurized gas forces liquid from the receptacle, torch and return line into the tank, to thereby substantially clear the receptacle, torch and return line of any liquid.

A flow restriction member may be provided to equalize pressure in the supply line with atmospheric pressure. The member includes a body connected at one end to the supply line (upstream of a check valve in the supply line) and at the other end to the return line. An orifice extending through the body provides a fluid communication path between the supply and return lines. The orifice is dimensioned to equalize pressure in the supply line upstream of the check valve with atmospheric pressure.

A vented cap may be inserted into an orifice in the top surface of the tank to maintain atmospheric pressure therein. The cap includes a base section and a larger diameter flange surrounding an inner section. At least one passage extends through the inner section for passing pressurized gas and thereby maintaining atmospheric pressure in the tank.

The invention also features a method for cooling a plasma arc torch mounted to a torch receptacle. The method includes providing a liquid storage tank, supply and return lines between the tank and the receptacle. Liquid is pumped (via a pump) from the tank through supply line, the receptacle, the torch and the return line for cooling the torch. The liquid is returned to the tank through a valve having a nozzle extending from a valve body and in fluid communication with the tank, wherein at least a portion of the nozzle is disposed at an angle of greater than zero degrees (and up to about 90 degrees) relative to a horizontal axis through the body such that liquid passing through the nozzle is directed toward an inside top surface of the tank.

The invention also features a method for replacing a plasma arc torch removably mounted to a torch receptacle. The torch is cooled by a cooling system having a liquid storage tank, supply and return lines providing fluid communication paths between the tank and the receptacle, and a pump for pumping liquid from the tank through the supply line, receptacle, torch, return line and back to the tank. The pump is turned off and pressurized gas is passed into the supply line to force liquid from the receptacle, torch and return line into the tank, thereby substantially clearing the receptacle, torch and return line of liquid. The torch may be manually or automatically replaced with minimal, if any, liquid leakage from the lines.

The method may also include turning off the pump and passing pressurized gas into the supply line to force liquid from the receptacle, torch and return line into the tank, thereby substantially clearing the receptacle, torch and return line of liquid. Further, a cap may be positioned in an orifice formed in the top surface of the tank, the cap having at least one passage extending therethrough. Pressurized gas within the tank passes through the at least one passage in the cap to maintain atmospheric pressure in the tank.

Further, the method may include directing liquid through an orifice in a flow restriction member. A flow restriction member is connected to the supply and return lines, the member having a body defining an orifice which provides a fluid communication path between the supply and return lines. Liquid is directed through the orifice to equalize the pressure in the supply line with atmospheric pressure.

The invention offers several advantages over existing plasma arc systems. One advantage is that the valve causes only a small amount of aeration of the liquid returned to the tank, resulting in a cleaner initial operation of the cooling system upon torch start-up as air is not introduced into the pump input. Another advantage is the pressurized gas source and the flow restriction member combine to provide minimum leakage of cooling liquid during the removal and replacement of a torch in a plasma arc torch system.

BRIEF DESCRIPTION OF THE DRAWINGS

The foregoing and other objects, features and advantages of the invention will become apparent from the following more particular description of preferred embodiments of the invention, as illustrated in the accompanying drawings. The drawings are not necessarily to scale, emphasis instead being placed on illustrating the principles of the present invention.

DETAILED DESCRIPTION

Figure 1:
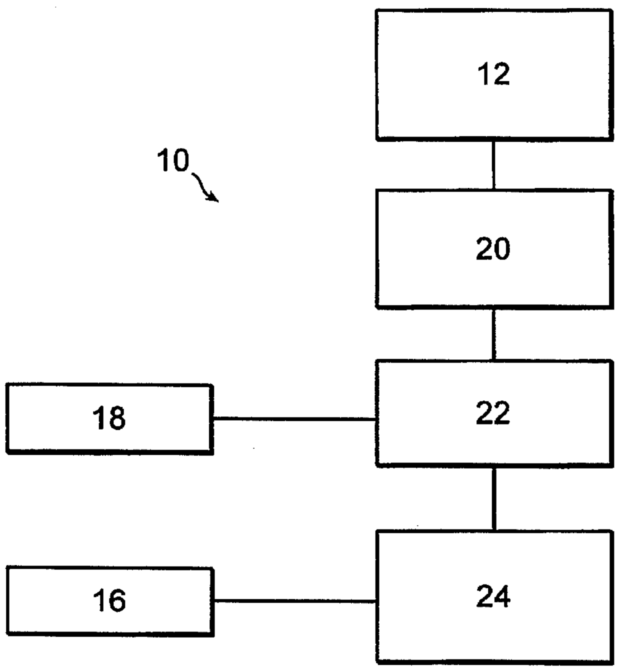
FIG. 1 is a block diagram of a mechanized high definition plasma arc torch system.

FIG. 1 illustrates a representative high definition plasma arc torch system 10 incorporating the principles of the invention. The system includes a controller 12, a storage rack 16, a power supply 18, a mechanical apparatus 20 including a Z-axis motor, a torch receptacle 22, and a torch 24. The power supply includes a high frequency high voltage (HFHV) generator which provides a signal to the torch during the starting process. The torch is removably mounted to the receptacle, which is coupled to the mechanical apparatus and used to capture and release the torch. The mechanical apparatus positions and moves the torch receptacle and torch horizontally for subsequent piercing and cutting.

The storage rack 16 provides a storage location for additional torches containing either unworn, or spent consumables. Generally, there are several torches in a rack and available for use. The process of changing a torch having worn consumables is described in detail below.

Figure 2:
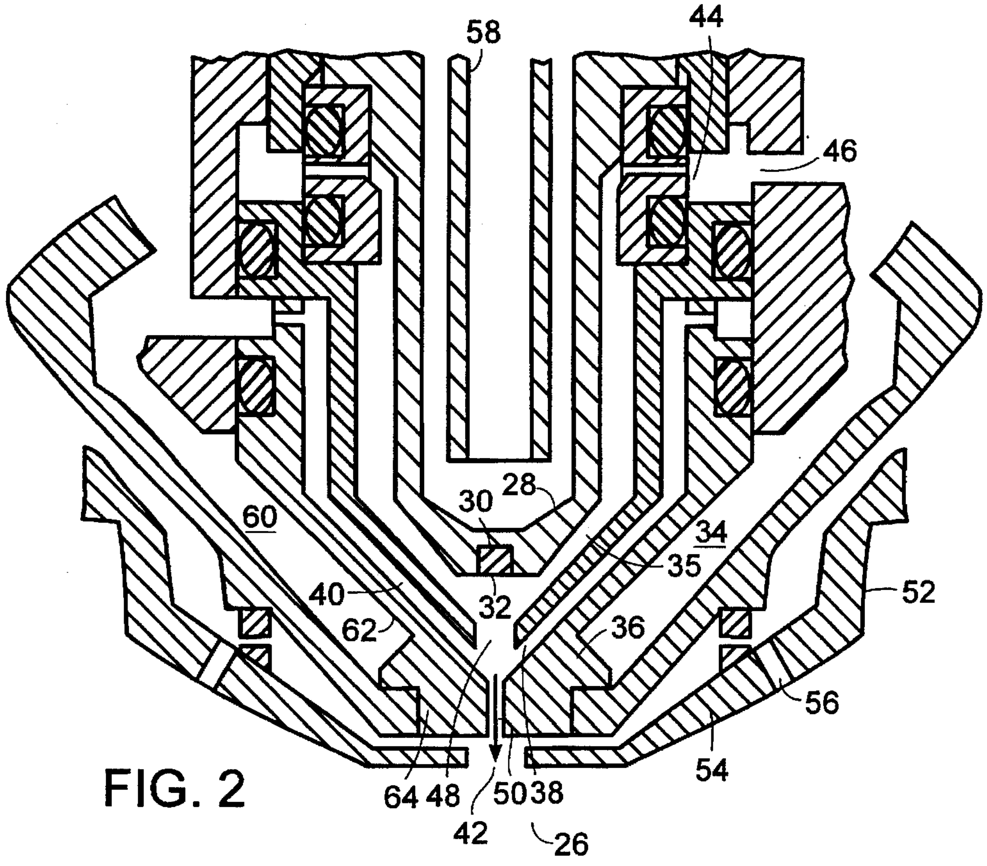
FIG. 2 is a partial cross-sectional view of a plasma arc torch utilized in the system shown in FIG. 1.

FIG. 2 is a partial cross-sectional view of the front end 26 of the torch 24 for the high definition plasma arc torch 14 shown in FIG. 1. The torch pierces and cuts metal, particularly mild steel, in a transferred arc mode and may be used to pierce, cut and shape other materials. In cutting mild steel, it operates with oxygen or air as the plasma gas to form a transferred arc. An electrode 28, typically formed of copper, has an insert 30 press fit into its lower end 32. The arc is highly constricted and has a current density of about 60,000 amperes/inch$^2$.

The front end of the torch includes a nozzle 34 having an inner piece 35 and an outer piece 36 with a flow path 38 formed therebetween to divert away a portion 40 of the plasma gas flow 42. The nozzle is of the general type described in U.S. Pat. No. 5,317,126, assigned to Hypertherm, Inc. A swirl ring 44 has canted ports 46 that impart a swirl to the plasma gas flow. This swirl creates a vortex that constricts and stabilizes the arc. The diversion of a portion of the plasma gas flow ensures a strong vortex flow through a plasma arc chamber 48 despite the relatively small cross sectional area of the nozzle exit orifice 50 at the outer nozzle piece. This strong vortex flow stabilizes the position of the arc on the insert.

A nozzle shield 52 guides a flow 54 of a secondary gas onto the arc. During cutting, the secondary gas flow rate is reduced so as not to destabilize the arc. The shield 52 includes bleed ports 56 angled away from the arc. The shield and the secondary gas flow protect the nozzle against molten metal splattered onto the nozzle from the workpiece which may produce gouging or double arcing. The shield is conductive, but mounted to insulating outer portion of the torch to be electrically floating and thereby resist double arcing. The shield operates in accordance with U.S. Pat. No. 4,861,962, assigned to Hypertherm, Inc.

The electrode 28 is hollow with a water inlet tube 58 extending down into the electrode. The cooling water circulates through the torch via internal passages to a water cooling chamber 60 where the water flows over the lower portion 62 of the nozzle to cool the nozzle, particularly the walls of the nozzle orifice 50. The tip 64 of the nozzle is thickened to provided mechanical strength and formed of a material having good thermal conductivity, such as copper, to serve as a heat sink.

Figure 3:
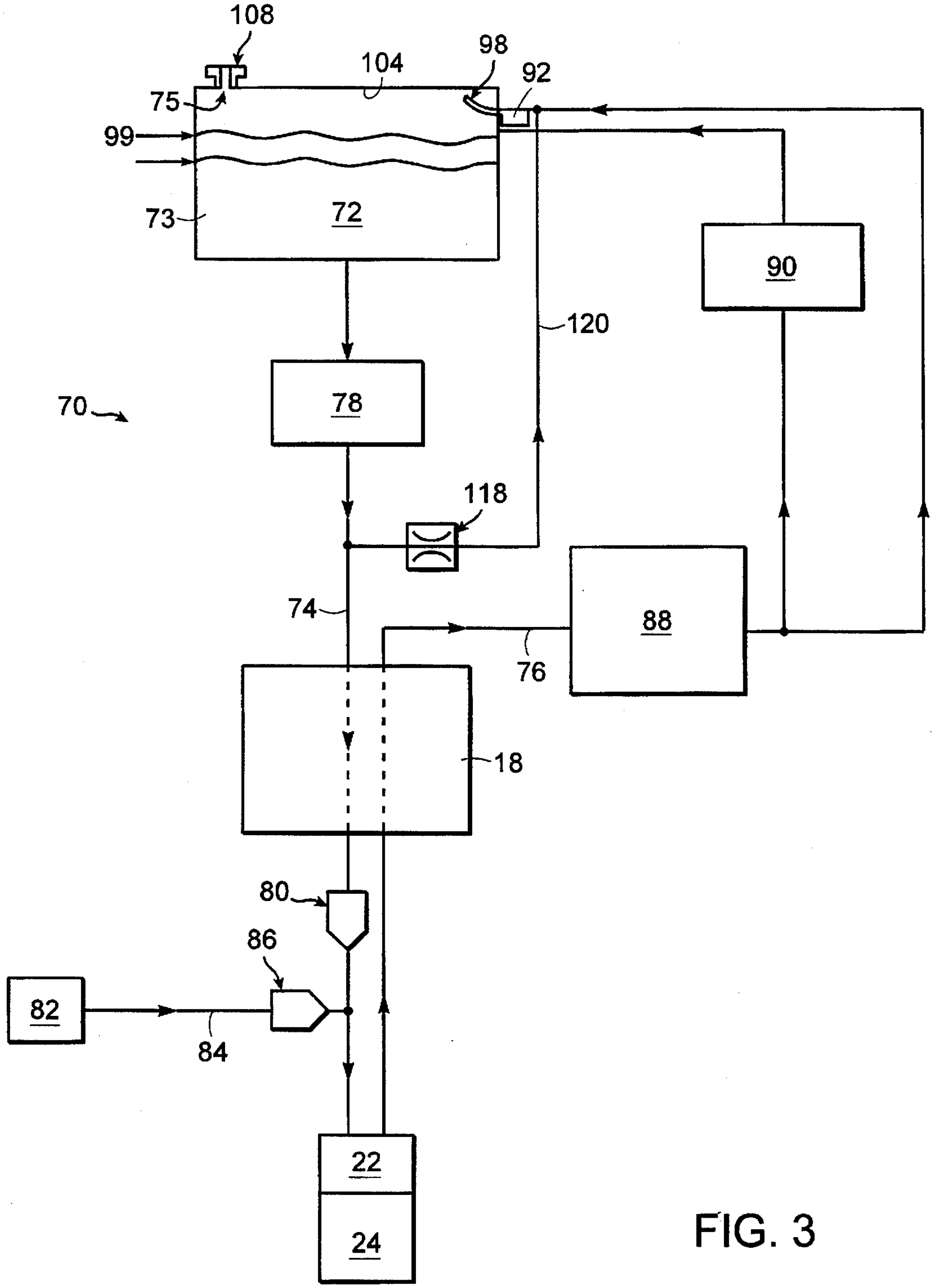
FIG. 3 is a block diagram of a cooling system incorporating the principles of the invention for the plasma arc torch system shown in FIG. 1.

FIG. 3 is a block diagram of a cooling system 70 for the plasma arc torch system. As shown, the torch 24 is removably mounted to the receptacle 22. The cooling system includes a liquid storage tank 72 containing a cooling liquid 73 such as water. An orifice 75 disposed in the top surface of the tank allows for the addition of liquid to or removal of liquid from the tank. A supply line 74 and a return line 76 provide fluid communication paths between the tank and the receptacle. A high pressure pump 78 pumps the cooling liquid from the tank through the supply line, the receptacle, the torch, the return line and back into the tank.

A first check valve 80 is connected to the supply line between the HFHV generator and the receptacle 22. A pressurized gas source 82 is connected to the supply line via a gas line 84. A second check valve 86 connected to the gas line prevents liquid from entering the gas line when the system 70 is operating. When the pump is not operating, the gas source supplies pressurized gas, such as air, to the supply line to substantially clear the receptacle, torch and return line of any liquid.

An air cooled heat exchanger 88 is connected to the return line. The heat exchanger removes heat added to the liquid as it passed through the torch. The return line splits into two branches downstream of the heat exchanger. A small percentage (e.g., about 10%) of the liquid passes through deionizing filter 90 and returns to the tank. The remaining liquid passes through a unique valve 92 prior to returning the liquid to the tank.

Figure 4:
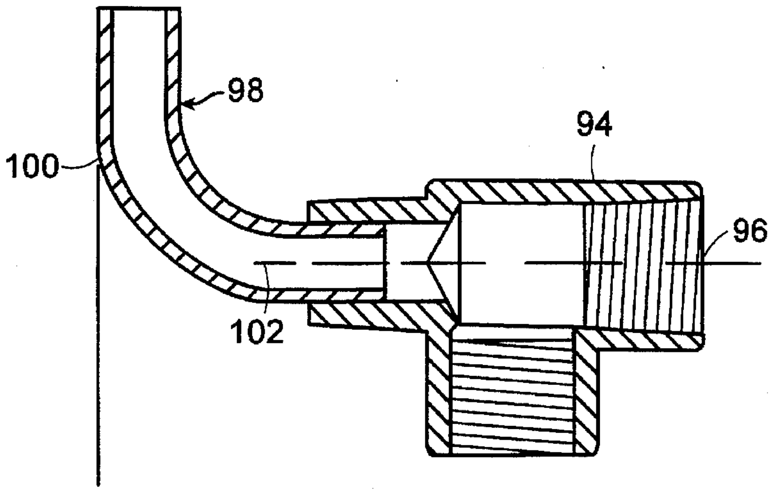
FIG. 4 is a cross-sectional view of a valve utilized in the cooling system shown in FIG. 3.

With reference to FIGS. 3 and 4, the valve 92 includes a body 94 having an input port 96 coupled to the return line. A nozzle 98 extends from the body and is in fluid communication with the tank. A portion 100 of the nozzle is disposed at an angle of greater than zero degrees and up to about 90 degrees relative to a horizontal axis 102 through the body. As such, liquid passing through the nozzle is directed toward an inside top surface 104 of the tank. This results in only a small amount of aeration of the liquid returned into the tank.

Figure 5:
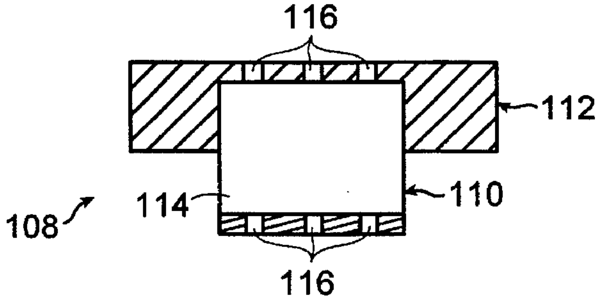
FIG. 5 is a cross-sectional view of a vented cap utilized in the cooling system shown in FIG. 3.

With reference to FIGS. 3 and 5, a vented cap 108 positioned in the orifice 75 is configured to maintain atmospheric pressure therein. The cap includes a base section 110 and a larger diameter flange section 112 integral therewith. A hollow inner section 114 is surrounded by the base and flange sections. The inner section has passages 116 extending through cap which vent any pressurized gas (supplied by the gas source) entering in the tank to the external environment, thereby maintaining atmospheric pressure in the tank.

Figure 6:
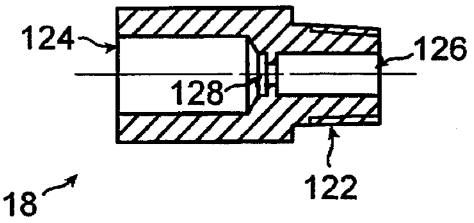
FIG. 6 is a cross-sectional view of a flow restriction member utilized in the cooling system shown in FIG. 3.

With reference to FIGS. 3 and 6, a flow restriction member 18 is connected to a secondary return path 120 to equalize pressure in the supply line with atmospheric pressure when the pump is not operating. The member includes a body 122 having an input port 124 connected to the supply line upstream of the first check valve 80. An output port 126 is connected to the valve 92 via the secondary return path. An orifice 128 extending through the body provides a fluid communication path between the supply and return lines. The orifice is dimensioned to equalize pressure in the supply line upstream of the check valve with atmospheric pressure.

In accordance with one aspect of the invention, the cooling system operates to cool consumable components, particularly the nozzle, disposed in the torch during operation of the plasma arc torch system. The pump pumps cooling liquid from the storage tank at a rate tailored to the particular system. In one representative system, the cooling liquid is water that leaves the pump at the rate of 1.1 gallons per minute at 175 PSI. The cooling liquid passes through the supply line, the HFHV generator and the first check valve to an inlet port on the torch receptacle. As noted previously, the liquid is prohibited from entering the gas line by the second check valve.

The liquid flows through the torch via internal passages and chambers (FIG. 2) and, still under pressure, flows from the receptacle into the return line. The liquid flowing through the return line passes back through the HFHV generator and the air cooled heat exchanger. At this point, a small percentage (e.g., about 10%) of the liquid passes through a deionizing filter back to the tank. The remaining liquid is returned to the tank through the valve. The nozzle is located above the torch change water level 99 and together with the vented cap facilitates proper spray free operation of the cooling system.

In accordance with another aspect of the invention, the plasma arc torch system includes a method for removing the torch, such as when various consumables within the torch require replacement. First, the pump is turned off. Any remaining pressure in the line is equalized to atmospheric pressure by the flow restriction member through the secondary return path and the valve. By equalizing the pressure in the supply line with atmospheric pressure, the flow restriction member eliminates any pressure differential across check valve, thereby minimizing leakage of liquid through the check valve during the removal process.

High pressure gas from the gas source is introduced into the supply line through the second check valve. The gas forces the cooling liquid back through the receptacle, the torch, the return line, the heat exchanger and into the tank through the valve. The time period that the gas is in the system is primarily a function of line length. Eventually, only gas is returning into the tank. Such gas escapes the tank through the vented cap as explained previously.

The torch is removed with no liquid leakage because the liquid in the supply line is retained by equalized pressure on both sides of the first check valve and liquid has been cleared from the return line. A new (or refurbished) torch is subsequently installed into the receptacle. Restarting the cooling system requires a period of time determined by the length of the return line.

EQUIVALENTS

While the invention has been particularly shown and described with reference to specific preferred embodiments, it should be understood by those skilled in the art that various changes in form and detail may be made therein without departing from the spirit and scope of the invention as defined by the appended claims.

We claim:

1. A plasma arc torch system comprising:

a torch receptacle;

a plasma arc torch removably mounted to the receptacle and including a cathode and an anode having a central orifice through which a transferred plasma arc passes to a workpiece; and a cooling system including (i) a liquid storage tank, (ii) supply and return lines providing fluid communication paths between the tank and the receptacle, (iii) a pump for pumping liquid from the tank through the supply line, the receptacle, the torch and the return line, and (v) a valve including a valve body having an input port coupled to the return line for receiving liquid therefrom and a nozzle extending from the body and providing a fluid communication return path to the tank, at least a portion of the nozzle disposed at an angle of greater than zero degrees relative to a horizontal axis extending through a center of the input port and through the valve body.

2. The plasma arc torch system of claim 1 further comprising a flow restriction member including:

a body having an input port connected to the supply line upstream of a first check valve and an output port connectable to the return line;

the body defining an orifice for providing a fluid communication path between the supply and return lines, the orifice being dimensioned to equalize a pressure in the supply line with atmospheric pressure when the pump is turned off.

3. The plasma arc torch system of claim 1 further comprising a pressurized gas source coupled to the supply line via a gas line and providing pressurized gas which forces liquid from the receptacle, torch and return line into the tank when the pump is turned off, to thereby substantially clear the receptacle, torch and return line of liquid.

4. The plasma arc torch system of claim 3 further comprising a cap including:

a base section disposed in an orifice formed in a top surface of the tank;

a flange section integral with the base section and having a larger diameter than the base section; and an inner section surrounded by the base and flange sections and having at least one passage extending therethrough for passing pressurized gas and thereby maintaining atmospheric pressure in the tank.

5. The plasma arc torch system of claim 1 wherein the portion of the nozzle is disposed at an angle of up to 90 degrees.

6. The plasma arc torch system of claim I wherein the liquid is water.

7. A valve for use in a plasma arc torch system having a plasma arc torch removably mounted to a torch receptacle and a cooling system including (i) a liquid storage tank, (ii) supply and return lines providing fluid communication paths between the tank and the receptacle, (iii) a pump for pumping liquid from the tank through the supply line, the receptacle, the torch and the return line, the return valve comprising:

a valve body having an input port connectable to the return line for receiving liquid therefrom; and a nozzle extending from the body for providing a fluid communication return path to the tank, at least a portion of the nozzle disposed at an angle of greater than zero degrees relative to a horizontal axis extending through a center of the input port and through the valve body.

8. The valve of claim 7 wherein the portion of the nozzle is disposed at an angle of up to 90 degrees.

9. The valve of claim 7 wherein the portion of the nozzle is disposed at an angle of about 90 degrees.

10. A flow restriction member for use in a plasma arc torch system having a plasma arc torch removably mounted to a torch receptacle and a cooling system including (i) a liquid storage tank, (ii) supply and return lines providing fluid communication paths between the tank and the receptacle, (iii) a pump for pumping liquid from the tank through the supply line, the receptacle, the torch, the return line and back to the tank, the flow restriction member comprising:

a body having an input port connectable to the supply line and an output port connectable to the return line;

the body defining an orifice for providing a fluid communication path between the supply and return lines, the orifice being dimensioned to equalize a pressure in the supply line with atmospheric pressure when the pump is turned off.

11. A cap for use in a plasma arc torch system having a plasma arc torch removably mounted to a torch receptacle and a cooling system including (i) a liquid storage tank, (ii) supply and return lines providing fluid communication paths between the tank and the receptacle, (iii) a pump for pumping liquid from the tank through the supply line, the receptacle, the torch, the return line and back to the tank, the cap comprising:

a base section insertable into an orifice formed in a top surface of the tank;

a flange section integral with the base section and having a larger diameter than the base section; and an inner section surrounded by the base and flange sections and having at least one passage extending therethrough for passing pressurized gas and thereby maintaining atmospheric pressure in the tank.

12. A method for cooling a plasma arc torch removably mounted to a torch receptacle, comprising:

providing a storage tank which includes a cooling liquid;

providing supply and return lines between the tank and the receptacle;

directing liquid from the tank through supply line, the receptacle, the torch and the return line for cooling the torch;

returning liquid to the tank through a valve having an input port and a nozzle extending from a valve body and in fluid communication with the tank, at least a portion of the nozzle being disposed at an angle of greater than zero degrees relative to a horizontal axis extending through a center of the input port and the valve body, the returning step including passing liquid through the nozzle toward an inside top surface of the tank.

13. The method of claim 12 further comprising passing pressurized gas into the supply line for forcing liquid from the receptacle, torch and return line into the tank, to thereby substantially clear the receptacle, torch and return line of liquid.

14. The method of claim 13 further comprising:

positioning a cap in an orifice formed in the top surface of the tank, the cap having at least one passage extending therethrough; and passing the pressurized gas through the at least one passage in the cap to maintain atmospheric pressure in the tank.

15. The method of claim 12 wherein the liquid is water.

16. The method of claim 12 further comprising directing liquid through an orifice in a flow restriction member, which provides a fluid communication path between the supply and return lines upstream of a check valve coupled to the supply line, to equalize a pressure in the supply line with atmospheric pressure.

17. A method for removing a plasma arc torch removably mounted to a torch receptacle in a plasma arc torch system having a cooling system including (i) a liquid storage tank, (ii) supply and return lines providing fluid communication paths between the tank and the receptacle, (iii) a pump for pumping liquid from the tank through the supply line, the receptacle, the torch, the return line and back to the tank, the method comprising:

turning off the pump;

passing pressurized gas into the supply line to force liquid from the receptacle, torch and return line into the tank, thereby substantially clearing the receptacle, torch and return line of liquid; and removing the torch.

18. The method of claim 17 further comprising:

positioning a cap in an orifice formed in a top surface of the tank, the cap having at least one passage extending therethrough; and passing the pressurized gas through the at least one passage in the cap to maintain atmospheric pressure in the tank.

19. The method of claim 17 further comprising:

directing liquid through an orifice in a flow restriction member, which provides a fluid communication path between the supply and return lines upstream of a check valve coupled to the supply line, to equalize a pressure in the supply line with atmospheric pressure;

connecting a flow restriction member to the supply and return lines, the member having a body defining an orifice which provides a fluid communication path between the supply and return lines; and directing liquid through the orifice to equalize a pressure in the supply line with atmospheric pressure.

20. A method for changing a plasma arc torch removably mounted to a torch receptacle in a plasma arc torch system having a cooling system including (i) a liquid storage tank, (ii) supply and return lines providing fluid communication paths between the tank and the receptacle, (iii) a check valve coupled to the supply line, and (iv) a pump for pumping liquid from the tank through the supply line, the receptacle, the torch, the return line and back to the tank, the method comprising:

turning off the pump;

directing liquid through an orifice in a flow restriction member, which provides a fluid communication path between the supply and return lines upstream of the check valve, to equalize a pressure in the supply line with atmospheric pressure;

passing pressurized gas into the supply line to force liquid from the receptacle, torch and return line into the tank, thereby substantially clearing the receptacle, torch and return line of liquid; and removing and replacing the torch.

21. A plasma arc torch system having a torch removably mounted to a receptacle comprising:

a cooling system including (i) supply and return lines providing fluid communication paths between a liquid storage tank and the receptacle, (iii) a pump for pumping liquid from the tank through the supply line, the receptacle, the torch and the return line, and (v) a valve including a valve body having an input port coupled to the return line for receiving liquid therefrom and a nozzle extending from the body and providing a fluid communication return path to the tank, at least a portion of the nozzle disposed at an angle of greater than zero degrees relative to an axis extending through a center of the input port and through the valve body.

22. The plasma arc torch system of claim 21 further comprising a flow restriction member including:

a body having an input port connected to the supply line upstream of a first check valve and an output port connectable to the return line;

the body defining an orifice for providing a fluid communication path between the supply and return lines, the orifice being dimensioned to equalize a pressure in the supply line with atmospheric pressure when the pump is turned off.

23. The plasma arc torch system of claim 21 further comprising a pressurized gas source coupled to the supply line via a gas line and providing pressurized gas which forces liquid from the receptacle, torch and return line into the tank when the pump is turned off, to thereby substantially clear the receptacle, torch and return line of liquid.

24. The plasma arc torch system of claim 23 further comprising a cap including:

a base section disposed in an orifice formed in a top surface of the tank;

a flange section integral with the base section and having a larger diameter than the base section; and an inner section surrounded by the base and flange sections and having at least one passage extending therethrough for passing pressurized gas and thereby maintaining atmospheric pressure in the tank.

25. A cooling system for use in a plasma arc torch system having a torch removably mounted to a receptacle, comprising:

supply and return lines providing fluid communication paths between a liquid storage tank and the receptacle;

a pump for pumping liquid from the tank through the supply line, the receptacle, the torch and the return line; and a valve including a valve body having an input port coupled to the return line for receiving liquid therefrom and a nozzle extending from the body and providing a fluid communication rerum path to the tank, at least a portion of the nozzle disposed at an angle of greater than zero degrees relative to an axis extending through a center of the input port and through the valve body.

* * * * *